US012683070B2

(12) United States Patent
Yang et al.

(10) Patent No.: US 12,683,070 B2
(45) Date of Patent: Jul. 14, 2026

(54) INDUCTOR

(71) Applicant: TAI-TECH ADVANCED ELECTRONICS CO., LTD., Taoyuan City (TW)

(72) Inventors: Hsiang-Chung Yang, Taoyuan City (TW); Pao-Lin Shen, Taoyuan City (TW); Ming-Yen Hsieh, Taoyuan City (TW)

(73) Assignee: TAI-TECH ADVANCED ELECTRONICS CO., LTD., Taoyuan City (TW)

( * ) Notice: Subject to any disclaimer, the term of this patent is extended or adjusted under 35 U.S.C. 154(b) by 793 days.

(21) Appl. No.: 18/085,599

(22) Filed: Dec. 21, 2022

(65) Prior Publication Data

US 2024/0212925 A1 Jun. 27, 2024

(51) Int. Cl.
*H01F 27/32* (2006.01)
*H01F 17/04* (2006.01)
*H01F 27/29* (2006.01)

(52) U.S. Cl.
CPC ........... *H01F 27/327* (2013.01); *H01F 17/04* (2013.01); *H01F 27/292* (2013.01); *H01F 2017/048* (2013.01)

(58) Field of Classification Search
CPC ...... H01F 27/327; H01F 17/04; H01F 27/292; H01F 2017/048
USPC .................................................. 336/195, 205
See application file for complete search history.

(56) References Cited

U.S. PATENT DOCUMENTS 10,784,036 B2 * 9/2020 Kobayashi ............ H01F 27/324
10,867,736 B2 * 12/2020 Kojima .................... H01F 27/29
2008/0055034 A1 * 3/2008 Tsunemi ................... H01F 3/10 336/83
2016/0027574 A1 * 1/2016 Aoki ..................... H01F 17/045 336/192
2018/0322996 A1 * 11/2018 Kobayashi ............ H01F 27/324
2020/0105451 A1 * 4/2020 Horie .................... H01F 27/263

FOREIGN PATENT DOCUMENTS

CN 208889416 U * 5/2019
JP 2003332142 A * 11/2003
KR 20180110592 A * 10/2018 ........... H01F 17/045

* cited by examiner

*Primary Examiner* — Shawki S Ismail
*Assistant Examiner* — Joselito S. Baisa
(74) *Attorney, Agent, or Firm* — Leong C. Lei

(57) ABSTRACT

The inductor includes a core, a floor plate, a first protection layer, and a second protection layer. The core includes a first flange, a second flange, and a middle section, where the middle section is sandwiched between the first and second flange, the middle section is wound around by a coil, the first and second flanges respectively have a side upon which at least an electrode is configured, and the coil is connected to the electrodes. The floor plate is adhered to other sides of the first and second flanges. The first protection layer completely covers the floor plate, and partially covers the first and second flanges, and the middle section. The electrodes on the first and second flanges are exposed outside the first protection layer. The second protection layer completely covers the coil around the middle section.

5 Claims, 4 Drawing Sheets

INDUCTOR

BACKGROUND OF THE INVENTION

(a) Technical Field of the Invention

The present invention is generally related to inductors, and more particular to an improved structure of inductors.

(b) Description of the Prior Art

Generally, an inductor, after wire winding, is coated and sealed by an adhesive applied from a dispenser. The adhesive is usually an ultraviolet (UV) curable resin, which is a resin blended with some light sensitive material (photosensitizer/photoinitiator) that would be quickly solidified after being exposed to UV light.

As shown in FIGS. 1 and 2, an inductor includes a core 100 configured with electrodes 110, a coil 120, and a protection layer 200 made of UV curable resin wrapping and protecting the core 100. The inductor is fixed on a circuit board through surface mount technology (SMT).

Usually, the protection layer 200 is formed by placing the core 100 in a tank and injecting UV curable resin into the tank by a dispenser. As the electrodes 110 have to be exposed outside the protection layer 200 for connection to the circuit board, the coil 120 is partially covered by the protection layer 200, as shown in FIG. 1. As such, the coil 120 may be damaged when the inductor is fixed to the circuit board. In addition, solder beads may spatter on the coil 120 as the inductor goes through reflow, causing the coil 120 to be short-circuited.

SUMMARY OF THE INVENTION

The present invention teaches an inductor, which includes a core, a floor plate, a first protection layer, and a second protection layer. The core includes a first flange, a second flange, and a middle section, where the middle section is sandwiched between the first flange and the second flange, the middle section is wound around by a coil, the first flange has a first side upon which at least an electrode is configured, the second flange has a second side upon which at least an electrode is configured, and the coil is connected to the electrodes. The floor plate is adhered to other sides of the first and second flanges. The first protection layer completely covers the floor plate, and partially covers the first flange, the second flange, and the middle section. The at least an electrode on the first side and the at least an electrode on the second side are exposed outside the first protection layer. The second protection layer completely covers the coil around the middle section.

The first protection layer has a vertical coverage of the first flange, the second flange, and the middle section up to the first side the first flange and the second side of the second flange but not over the electrodes thereupon.

In an embodiment, the first protection layer is made of ultraviolet (UV) curable resin or insulative resin.

In an embodiment, the first protection layer is made of a mixture of UV curable resin and magnetic powders.

In an embodiment, the second protection layer is made of UV curable resin or insulative resin.

In an embodiment, the second protection layer is made of a mixture of UV curable resin and magnetic powders.

The inductor has the following advantages. Firstly, the coil is fully protected by being completely covered by the second protection layer so that the coil does not suffer external impact when the inductor is installed on a circuit board, and the coil is prevented from being short-circuited by solder beads splattered during reflow. Secondly, the electrodes on the first flange and the second flange are kept exposed outside the first protection layer so that they may be conveniently connected to the circuit board.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
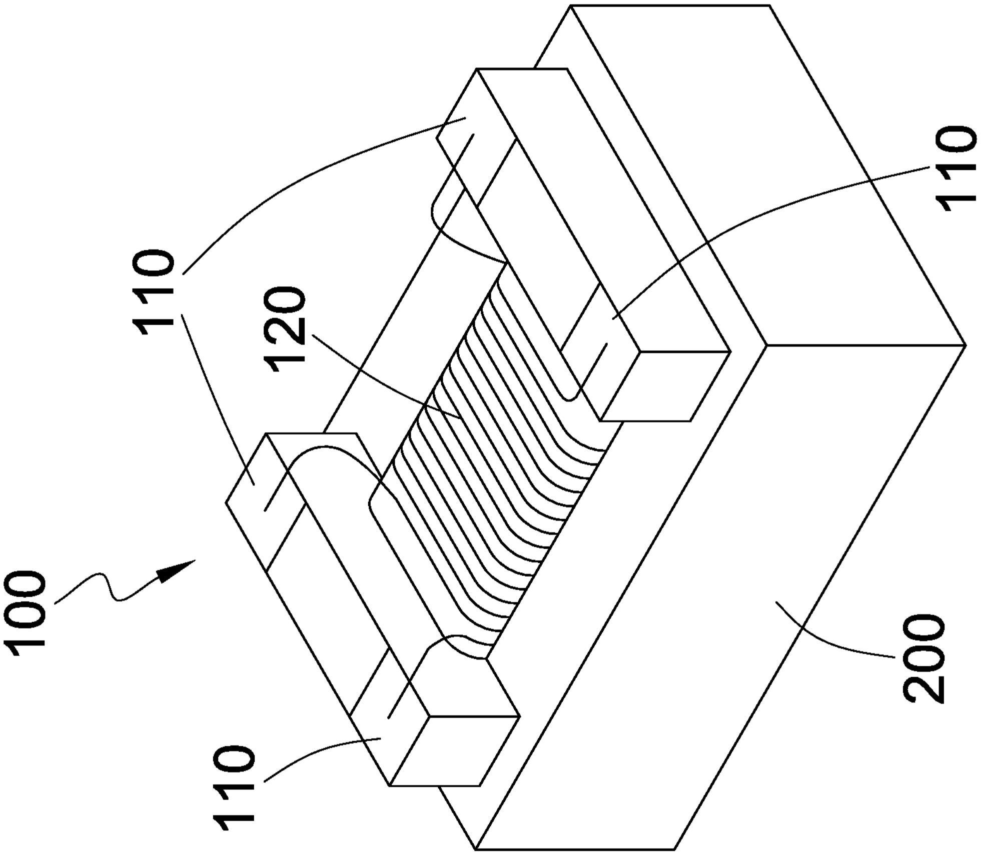
PRIOR ART FIG. 1
FIG. 1 is a perspective diagram showing a conventional inductor.
Figure 2:
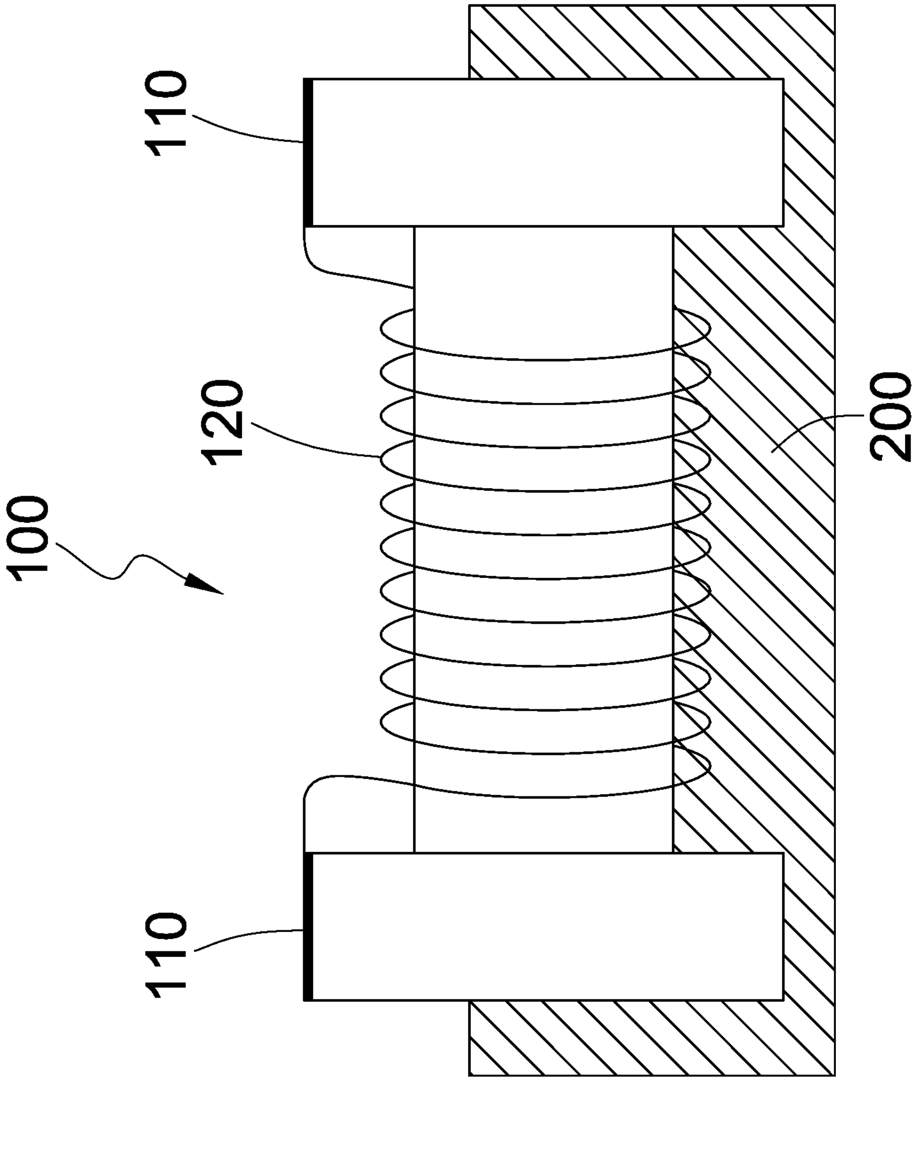
PRIOR ART FIG. 2
FIG. 2 is a side-view diagram showing the conventional inductor of FIG. 1.
Figure 3:
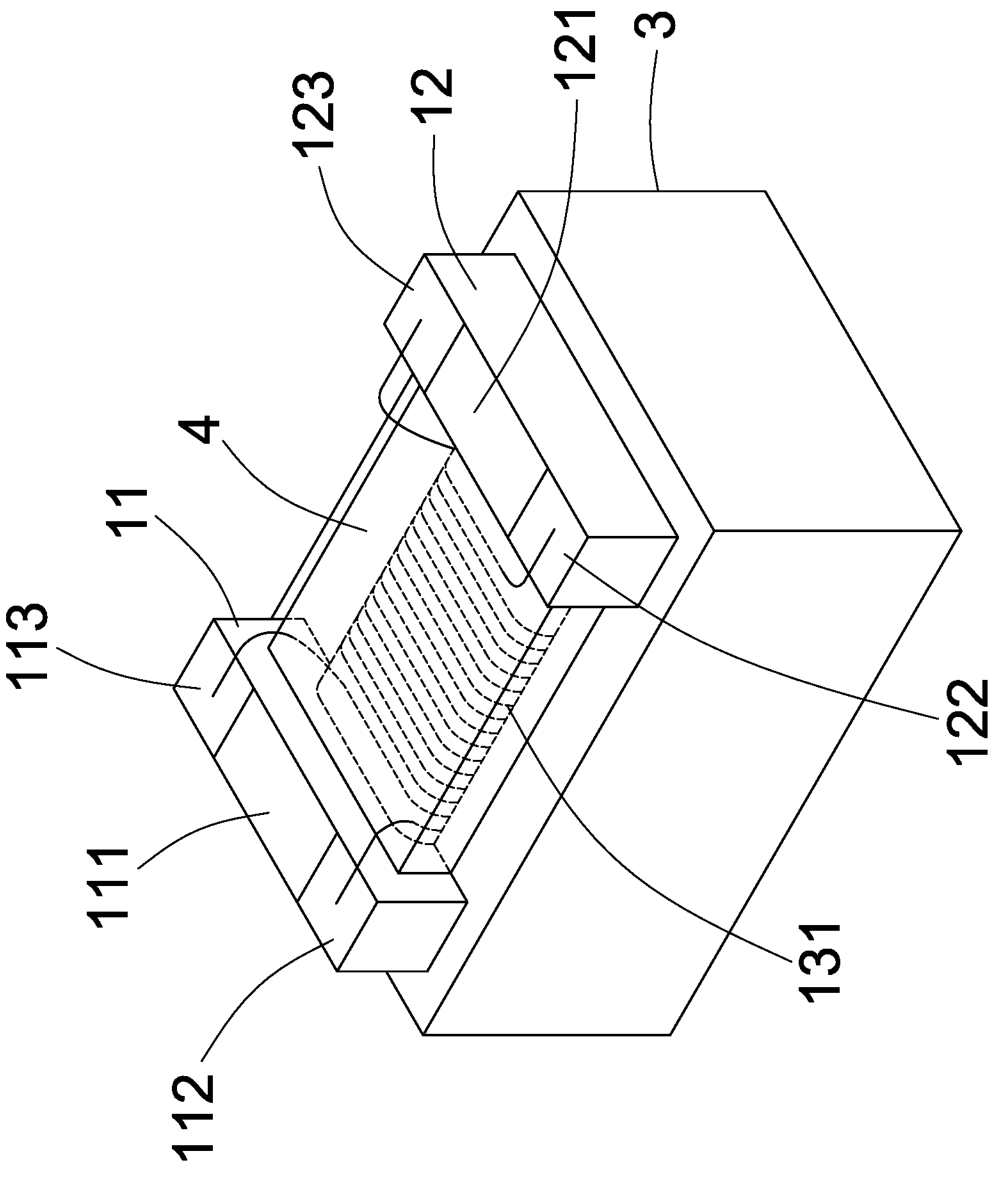
FIG. 3 is a perspective diagram showing an inductor according to an embodiment of the present invention.
Figure 4:
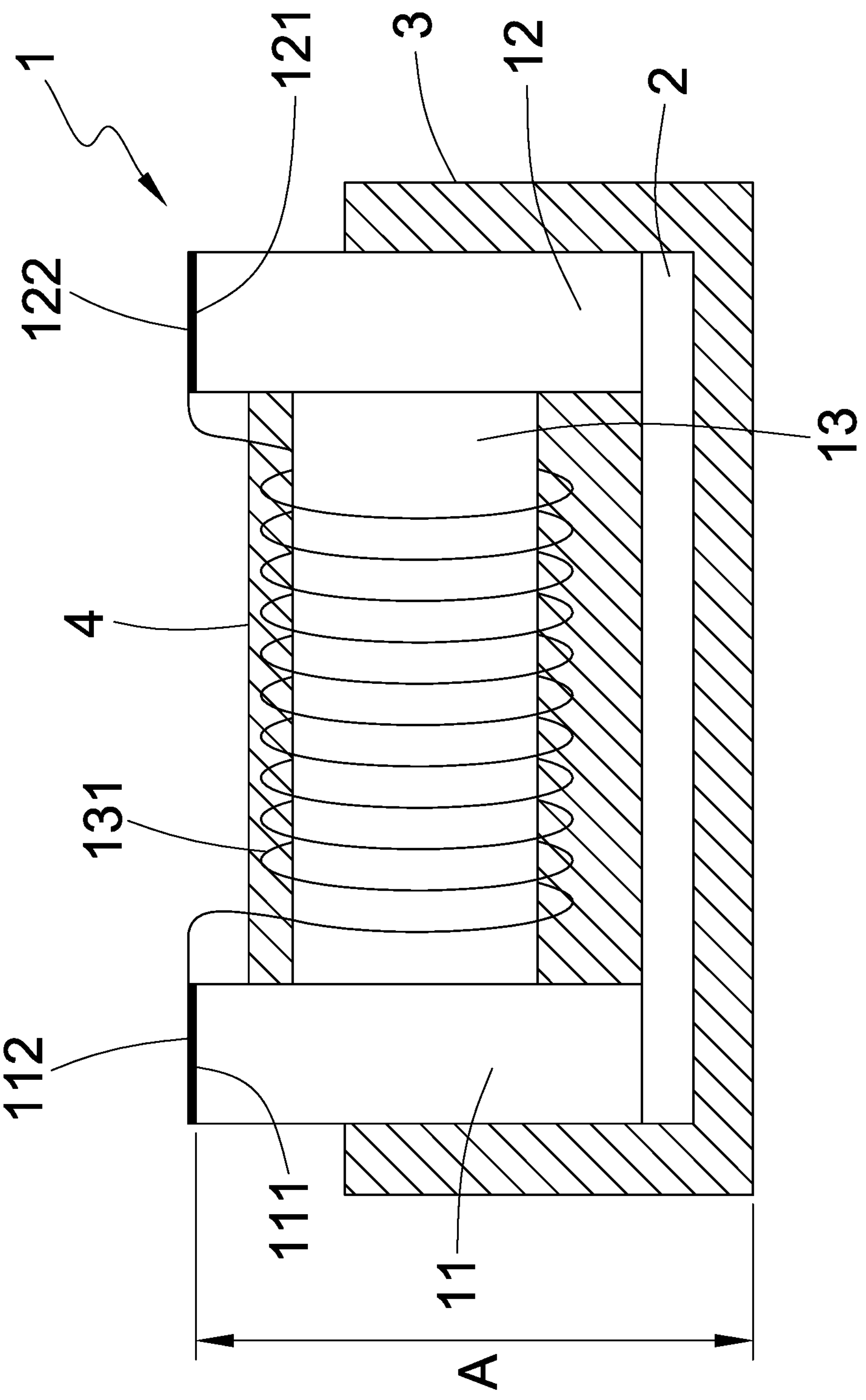
FIG. 4 is a side-view diagram showing the inductor of FIG. 3.

As shown in FIGS. 3 and 4, an inductor according to an embodiment of the present invention includes a core 1, a floor plate 2, a first protection layer 3, and a second protection layer 4.

The core 1 includes a first flange 11, a second flange 12, and a middle section 13. The middle section 13 is sandwiched between the first flange 11 and the second flange 12 to form an I-like shape. The middle section 13 is wound around by a coil 131. Each of the first flange 11 and the second flange 12 has a side upon which electrodes are configured. The coil 131's two ends are respectively connected to the electrodes. The electrodes are made of highly conductive material such as silver. More specifically, the first flange 11 has a first side 111 and the second flange 12 has a second side 121. The first side 111 is configured with a first electrode 112 and a second electrode 113. The second side 121 is configured with a third electrode 122 and a fourth electrode 123. The coil 131 includes a number of windings. The windings of the coil 131 are respectively connected to the first electrode 112, the second electrode 113, the third electrode 122, and the fourth electrode 123.

The first flange 11 has another side opposite to the first side 111 with no electrode. The second flange 12 also has another side opposite to the second side 121 with no electrode. The floor plate 2 is adhered to the first flange 11's another side and to the second flange 12's another side by UV curable resin. The floor plate 2, by providing a flat and planar surface to the core 1, facilitates the adhesion of the inductor to the circuit board in a surface-mount device (SMD) process.

The first protection layer 3 completely covers the floor plate 2, and partially covers the first flange 11, the second flange 12, and the middle section 13. The electrodes are exposed outside the first protection layer 3. The first protection layer 3 may be made of UV curable resin, insulative resin, or a mixture of UV curable resin and magnetic powders. The insulative resin may be epoxy resin or polyimide resin. More specifically, the first protection layer 3 has a vertical coverage range including the first flange 11, the second flange 12, and the middle section 13, up to the first side 111 of the first flange 11 and the second side 121 of the second flange 12 by not over the first electrode 112, the second electrode 113, the third electrode 122, and the fourth electrode 123 thereupon, so that subsequently the electrodes are available for connection to the circuit board.

The second protection layer 4 completely covers the coil 131 around the middle section 13. The second protection layer 4 may be made of UV curable resin, insulative resin, or a mixture of UV curable resin and magnetic powders. The insulative resin may be epoxy resin or polyimide resin.

To form the inductor, the core 1 and the floor plate 2 are stacked in a tank into which UV curable resin (or insulative resin or a mixture of UV curable resin and magnetic powders) is injected in a first injection through a dispenser to form the first protection layer 3. The protection layer 3 partially covers the first flange 11, the second flange 12, and the middle section 13 (including the coil 131 around the middle section 13). As the coil 131 is exposed, UV curable resin is injected again in a second injection into the tank to form the second protection layer 4 that completely covers the middle section 13 and the coil 131.

The inductor as described has the following advantages. Firstly, the coil 131 is fully protected by being completely covered by the second protection layer 4 so that the coil 131 does not suffer external impact when the inductor is installed on a circuit board, and the coil 131 is prevented from being short-circuited by solder beads splattered during reflow. Secondly, the electrodes on the first flange 11 and the second flange 12 are kept exposed outside the first protection layer 3 so that they may be conveniently connected to the circuit board.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. An inductor, comprising:

a core comprising a first flange, a second flange, and a middle section, where the middle section is sandwiched between the first flange and the second flange, the middle section is wound around by a coil, the first flange has a first side upon which at least an electrode is configured, the second flange has a second side upon which at least an electrode is configured, and the coil is connected to the electrodes;

a floor plate, where the first flange has another side opposite to the first side with no electrode, the second flange has another side opposite to the second side with no electrode, and the floor plate is adhered to the first flange's another side and to the second flange's another side;

a first protection layer completely covering the floor plate, and partially covering the first flange, the second flange, and the middle section, and the at least an electrode on the first side and the at least an electrode on the second side are exposed outside the first protection layer; and a second protection layer completely covering the coil around the middle section, wherein the first protection layer has a vertical coverage of the first flange, the second flange, and the middle section up to the first side the first flange and the second side of the second flange but not over the electrodes thereupon, and wherein the first protection layer partially covers the middle section to expose a portion of the coil between the first flange and the second flange, and the second protection layer is opposite to the first protection layer and is arranged between the first flange and second flange to cover the exposed portion of coil.

2. The inductor according to claim 1, wherein the first protection layer is made of ultraviolet (UV) curable resin or insulative resin.

3. The inductor according to claim 1, wherein the first protection layer is made of a mixture of UV curable resin and magnetic powders.

4. The inductor according to claim 1, wherein the second protection layer is made of UV curable resin or insulative resin.

5. The inductor according to claim 1, wherein the second protection layer is made of a mixture of UV curable resin and magnetic powders.

* * * * *